(12) United States Patent  
Chien et al.

(10) Patent No.: US 11,769,032 B2  
(45) Date of Patent: *Sep. 26, 2023

(54) ELECTRONIC SYSTEM, PORTABLE ELECTRONIC DEVICE AND COUNTING INFORMATION UPDATING METHOD

(71) Applicant: Acer Incorporated, New Taipei (TW)

(72) Inventors: Chih-Chieh Chien, New Taipei (TW); Yi-Chun Chung, New Taipei (TW); Pei-Wen Jung, New Taipei (TW); Yen-Ming Hsu, New Taipei (TW)

(73) Assignee: Acer Incorporated, New Taipei (TW)

( * ) Notice: Subject to any disclaimer, the term of this patent is extended or adjusted under 35 U.S.C. 154(b) by 267 days.

This patent is subject to a terminal disclaimer.

(21) Appl. No.: 17/133,635

(22) Filed: Dec. 24, 2020

(65) Prior Publication Data

US 2021/0117753 A1 Apr. 22, 2021

Related U.S. Application Data

(63) Continuation of application No. 16/554,612, filed on Aug. 28, 2019, now Pat. No. 10,915,807.

(30) Foreign Application Priority Data

Aug. 31, 2018 (TW) .................................. 107130681

(51) Int. Cl.  
 *G06M 11/00* (2006.01)  
 *G01P 15/14* (2013.01)

(52) U.S. Cl.  
 CPC ............. *G06M 11/00* (2013.01); *G01P 15/14* (2013.01)

(58) Field of Classification Search  
 None  
 See application file for complete search history.

(56) References Cited

U.S. PATENT DOCUMENTS

2018/0061271 A1* 3/2018 Mohammed ............ G06F 3/017

* cited by examiner

*Primary Examiner* — Roy Y Yi  
(74) *Attorney, Agent, or Firm* — JCIPRNET (57) ABSTRACT

An embodiment of the present invention provides a counting information updating method for a portable electronic device having a plurality of spheres connected with each other. The method includes: generating an angular velocity signal by a first sensor of the portable electronic device and generating an acceleration signal by a second sensor of the portable electronic device in response to a sphere moving operation; and estimating counting information corresponding to the sphere moving operation by using the angular velocity signal with an assistance of the acceleration signal.

18 Claims, 9 Drawing Sheets

ELECTRONIC SYSTEM, PORTABLE ELECTRONIC DEVICE AND COUNTING INFORMATION UPDATING METHOD

CROSS-REFERENCE TO RELATED APPLICATION

This application is a continuation application of and claims the priority benefit of U.S. application Ser. No. 16/554,612, filed on Aug. 28, 2019, now pending, which claims the priority benefit of Taiwan application serial no. 107130681, filed on Aug. 31, 2018. The entirety of each of the above-mentioned patent applications is hereby incorporated by reference herein and made a part of this specification.

BACKGROUND

Technical Field

The present invention relates to an electronic device operating mechanism, and more particularly to an electronic system, a portable electronic device, and a counting information updating method.

Description of Related Art

In addition to the material life of modern people, spiritual beliefs have gradually become part of people's daily lives. Generally, beads wore by a user are made of materials such as wood or plastic and do not have electronic computing functions. When a user moves the beads and simultaneously recites the scriptures, the user may need to count the times with the watch or in the mind. As such, it is easy to cause distraction to the user and the counting number is often inaccurate.

Although some types of electronic devices have built-in gravity sensors or accelerometers, however, both the gravity sensor and the accelerometer are based on gravity changes for three-axis or six-axis positioning. If the user rotates the device in the horizontal direction, then the gravity change detected by the gravity sensor or accelerometer may be too small. As such, the rotation state of the device may not be accurately detected. In addition, gravity sensors or accelerometers are also susceptible to unexpected sloshing of the device, which leads to a misjudgment.

SUMMARY

The invention provides an electronic system, a portable electronic device and a counting information updating method, which are capable of automatically and accurately updating counting information related to the moving of the portable electronic device.

Embodiments of the present invention provide an electronic system including a communication device and a portable electronic device. The portable electronic device is wirelessly connected to the communication device. The portable electronic device includes a processor, a communication circuit, a first sensor, a second sensor, and a plurality of spheres connected with each other. The processor is connected to the communication circuit, the first sensor, and the second sensor. The processor, the communication circuit, the first sensor, and the second sensor are disposed in a first sphere of the spheres. In response to a sphere moving operation, the first sensor generates an angular velocity signal, and the second sensor generates an acceleration signal. The processor estimates counting information corresponding to the sphere moving operation by using the angular velocity signal with an assistance of the acceleration signal. The processor transmits the counting information to the communication device.

Embodiments of the present invention further provides a portable electronic device including a plurality of spheres connected with each other, a first sensor, a second sensor, and a processor. The processor is connected to the first sensor and the second sensor. The processor, the first sensor, and the second sensor are disposed in a first sphere of the spheres. In response to a sphere moving operation, the first sensor generates an angular velocity signal and the second sensor generates an acceleration signal. The processor estimates counting information corresponding to the sphere moving operation by using the angular velocity signal with an assistance of the acceleration signal.

Embodiments of the present invention further provides a counting information updating method for a portable electronic device having a plurality of spheres connected with each other. The counting information update method includes: generating an angular velocity signal by a first sensor of the portable electronic device and generating an acceleration signal by a second sensor of the portable electronic device in response to a sphere moving operation; and estimating counting information corresponding to the sphere moving operation by using the angular velocity signal with an assistance of the acceleration signal.

Embodiments of the present invention further provide an electronic system including a communication device and a portable electronic device. The portable electronic device is wirelessly connected to the communication device. The portable electronic device includes a processor, a communication circuit, and a plurality of spheres connected with each other. The processor is connected to the communication circuit. The processor and the communication circuit are disposed in a first sphere of the spheres. The processor determines whether the portable electronic device is a first type portable electronic device or a second type portable electronic device. If the portable electronic device is the first type portable electronic device, the processor activates a first counting mode to estimate the counting information corresponding to a sphere moving operation. If the portable electronic device is the second type portable electronic device, the processor activates a second counting mode to estimate the counting information corresponding to the sphere moving operation.

Embodiments of the present invention further provide a portable electronic device including a plurality of spheres connected with each other and a processor. The processor is disposed in a first sphere of the spheres. The processor determines whether the portable electronic device is a first type portable electronic device or a second type portable electronic device. If the portable electronic device is the first type portable electronic device, the processor activates a first counting mode to estimate the counting information corresponding to a sphere moving operation. If the portable electronic device is the second type portable electronic device, the processor activates a second counting mode to estimate the counting information corresponding to the sphere moving operation.

Embodiments of the present invention further provides a counting information updating method for a portable electronic device having a plurality of spheres connected with each other. The counting information update method includes: determining whether the portable electronic device is a first type portable electronic device or a second type portable electronic device; if the portable electronic device is the first type portable electronic device, activating a first counting mode to estimate counting information corresponding to a sphere moving operation; and if the portable electronic device is the second type portable electronic device, activating a second counting mode to estimate the counting information corresponding to the sphere moving operation.

Based on the above, when a sphere moving operation performed on the portable electronic device occurs, the first sensor and the second sensor respectively generate an angular velocity signal and an acceleration signal. The angular velocity signal can then be used to assist the acceleration signal to estimate the counting information corresponding to the sphere moving operation. Thereby, the problem that the portable electronic device cannot accurately calculate the number of dialings (or movings) of the spheres under certain conditions can be effectively improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
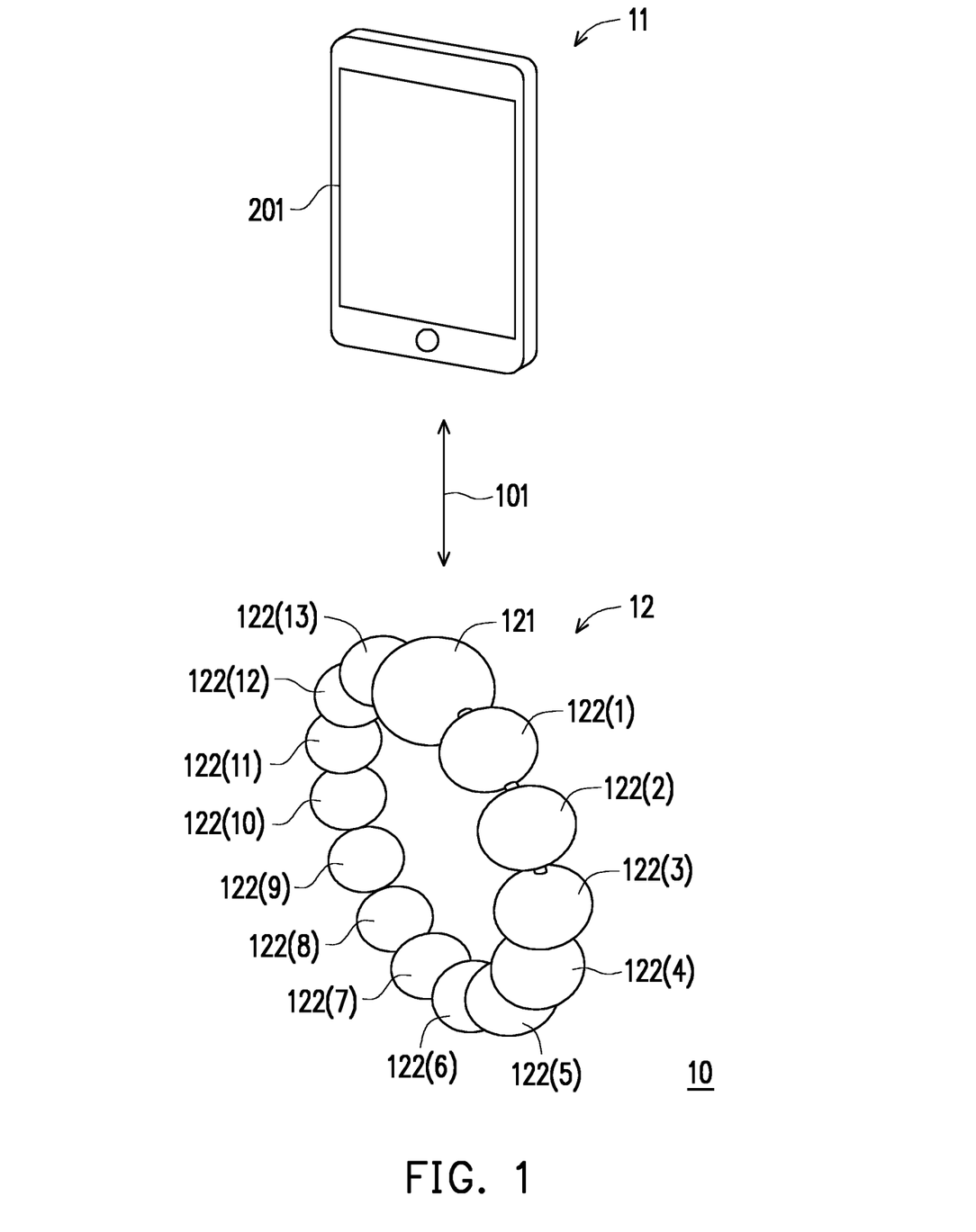
FIG. 1 is a schematic diagram of an electronic system according to an embodiment of the invention.

FIG. 1 is a schematic diagram of an electronic system according to an embodiment of the invention. Referring to FIG. 1, an electronic system 10 includes a communication device 11 and a portable electronic device 12. The communication device 11 may communicate with the portable electronic device 12 via a connection 101 in a wired or wireless manner. In an embodiment, the communication device 11 is a smart phone, for example. However, in another embodiment, the communication device 11 may also be a portable computing device having communication, computing, storage, and display functions, such as a tablet computer or a notebook computer. Alternatively, in another embodiment, the communication device 11 may also be a (non-portable) computing device having communication, computing, storage, and display functions, such as a desktop computer, an industrial computer, or a server host.

The portable electronic device 12 may look like a beaded bracelet or a beaded necklace, as shown in FIG. 1. For example, the portable electronic device 12 is adapted to be worn by a user on a hand bowl or on the neck. The portable electronic device 12 includes spheres 121 and 122 (1) to 122 (13). In an embodiment, the total number of the spheres 121 and 122(1) to 122(13) is 14. In another embodiment, the total number of the sphere 121 and/or the total number of the spheres 122(1)~122(13) may be more or less, and the invention is not limited thereto.

The spheres 121 and 122(1) to 122(13) are connected to each other through a line having elasticity or no elasticity. In an embodiment, at least a portion of the spheres of the spheres 121 and 122(1)-122(13) may communicate with each other (e.g., the signals can be transmitted by wire or wirelessly). In another embodiment, the spheres 121 and 122(1)-122(13) cannot communicate with each other.

In an embodiment, the shape of each of the spheres 121 and 122(1) to 122(13) is a circular spherical shape. In another embodiment, the shape of at least one of the spheres 121 and 122 (1) to 122 (13) may be an elliptical spherical shape, a cylindrical shape, a three-dimensional cone shape or a three-dimensional rectangular shape, etc., which is not limited by the present invention.

In an embodiment, the sizes (e.g., radius and/or surface area) of the spheres 122(1)-122(13) are substantially the same, and the size (e.g., radius and/or surface area) of the sphere 121 is greater than that of each of the spheres 122(1) to 122(13). In another embodiment, the sizes (e.g., radius and/or surface area) of the spheres 121 and 122(1)-122(13) may also be substantially the same, at least partially the same, or at least partially different. In an embodiment, the spheres 121 and 122(1) to 122(13) are all hollow spheres. In another embodiment, the sphere 121 is a hollow sphere for disposing electronic circuits, and at least one of the spheres 122(1)-122(13) can be a solid sphere.

In an embodiment, the main constituent materials of the spheres 122(1) to 122(13) are the same, and the main constituent material of the sphere 121 is different from that of the spheres 122(1) to 122(13). For example, the main constituent material of the spheres 122(1) to 122(13) may be wood, and the main constituent material of the sphere 121 may not include wood. In another embodiment, the main constituent materials of at least two of the spheres 121 and 122(1) to 122(13) may be the same. In an embodiment, the main constituent material of any one of the spheres 121 and 122 (1) to 122 (13) may further include various metals or non-metals, such as plastic, carbon fiber or acrylic, which is not limited by the present invention.

Figure 2:
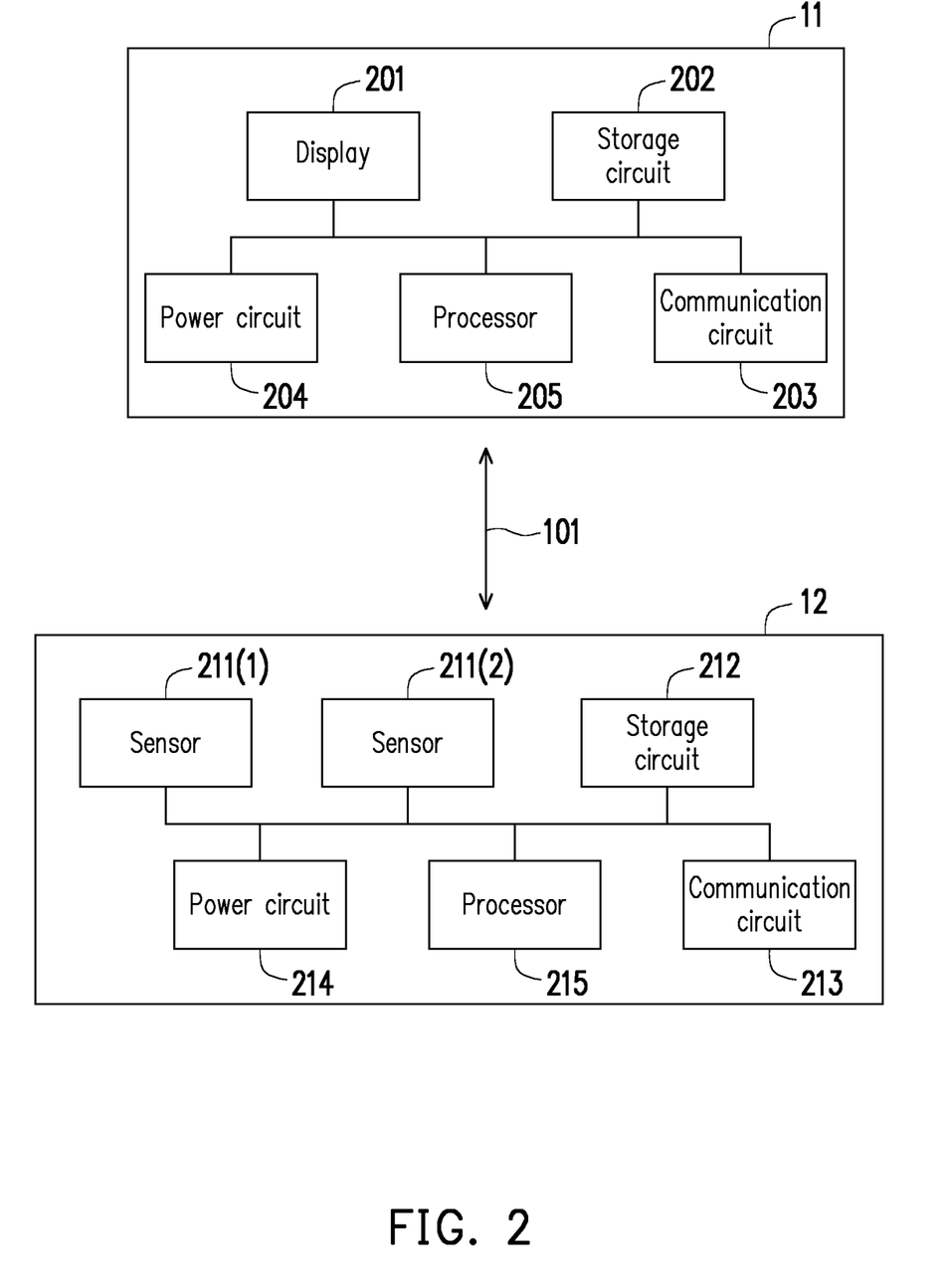
FIG. 2 is a functional block diagram of an electronic system according to an embodiment of the invention.

FIG. 2 is a functional block diagram of an electronic system according to an embodiment of the invention. Referring to FIG. 1 and FIG. 2, the communication device 11 includes a display 201, a storage circuit 202, a communication circuit 203, a power circuit 204, and a processor 205. The display 201, the storage circuit 202, the communication circuit 203, and the power circuit 204 may be connected to the processor 205. The display 201 is configured to display images. For example, the display 201 can be a Liquid Crystal Display (LCD), a Light-Emitting Diode (LED) display, an Organic Light Emitting Display (OLED), or an Electro-Phoretic Display (EPD) or other types of display. In addition, the display 201 may or may not support a touch function, and the present invention is not limited thereto.

The storage circuit 202 is configured to store data. For example, the storage circuit 202 may include volatile storage media and non-volatile storage media. The volatile storage medium may be a random access memory (RAM), and the non-volatile storage medium may be a read only memory (ROM), a solid state disk (SSD) or a hard disk drive (HDD). The communication circuit 203 is configured to communicate with the portable electronic device 12 via the connection 101. For example, the communication circuit 203 may include a wired and/or wireless network card. For example, the communication circuit 203 may support wireless communication protocols such as WIFI, Bluetooth, Bluetooth Low Energy (BLE), or Long Term Evolution (LTE), and/or wired communication protocols such as Ethernet, so as to establish the connection 101. The power circuit 204 is configured to provide power required for the execution of the communication device 11. For example, the power circuit 204 may include a battery or a power supply.

The processor 205 is configured to control the display 201, the storage circuit 202, and the communication circuit 203 to perform functions such as communication, calculation, storage, and display. For example, the processor 205 can be a central processing unit (CPU), a graphics processing unit (GPU) or other programmable general purpose or special purpose microprocessor, a digital signal processor, a programmable controller, a special application integrated circuit, a programmable logic device or other similar device or a combination of these devices. In another embodiment, the processor 205 may also control the overall operation of the communication device 11 or perform other functions or tasks, which are not limited by the present invention.

The portable electronic device 12 includes a sensor (also referred to as a first sensor) 211(1), a sensor (also referred to as a second sensor) 211(2), a storage circuit 212, a communication circuit 213, a power circuit 214, and a processor 215. The sensor 211(1), the sensor 211(2), the storage circuit 212, the communication circuit 213, and the power circuit 214 may be connected to the processor 215. The sensor 211(1), the sensor 211(2), the storage circuit 212, the communication circuit 213, the power circuit 214, and the processor 215 are all disposed in the sphere 121 (also referred to as the first sphere). In an embodiment, if the number of the first sphere is greater than one, then at least one of the sensor 211 (1), the sensor 211 (2), the storage circuit 212, the communication circuit 213, the power circuit 214, and the processor 215 may be distributed in these the first spheres.

The sensor 211(1) may sense an angular change (or angular velocity change) caused by a physical action (also known as a sphere moving operation) of the sphere 121 and generates an angular velocity signal. For example, the sensor 211(1) may include a gyroscope. The sensor 211(2) may sense a positional change (or gravity change) caused by the sphere moving operation of the sphere 121 and generates an acceleration signal. For example, the sensor 211(2) may include a gravity sensor, an accelerometer, and/or a magnetic sensor. In another embodiment, the portable electronic device 12 may have other types of sensors, for example, a distance sensor, a light sensor, a capacitance sensor, a resistance sensor, and/or a pressure sensor, etc., which are not limited by the present invention. In addition, the numbers of the sensors 211(1) and 211(2) may be one or more, respectively, and the present invention is not limited thereto.

The storage circuit 212 is configured to store data. For example, the storage circuit 212 may include volatile storage media and non-volatile storage media. The volatile storage medium may be a random access memory (RAM), and the non-volatile storage medium may be a read only memory (ROM) or a solid state disk (SSD). The communication circuit 213 is configured to communicate with the communication device 11 (for example, the communication circuit 203) via the connection 101. For example, the communication circuit 213 may include a wired and/or a wireless network card. For example, the communication circuit 213 may support wireless communication protocols such as WIFI, Bluetooth, Bluetooth Low Energy, or Long Term Evolution, and/or a wired communication protocol such as Ethernet, so as to establish the connection 101. The power circuit 214 is configured to provide power required for the execution of the portable electronic device 12. For example, the power circuit 214 may include a battery or a power supply. In an embodiment, the power circuit 214 may also has a wireless charging circuit to support a wireless charging function.

The processor 215 is configured to control the sensor 211(1), the sensor 211(2), the storage circuit 212, and the communication circuit 213 to perform functions such as sensing, communication, computing, and storage. For example, the processor 215 can be a central processing unit (CPU), a graphics processing unit (GPU), an embedded controller, or other programmable general purpose or special purpose microprocessor, digital signal processor, programmable controller, special application integrated circuit, programmable logic device or other similar device or a combination of these devices. In another embodiment, the processor 215 may also control the overall operation of the portable electronic device 12 or perform other functions or tasks, which are not limited in the present invention.

Figure 3:
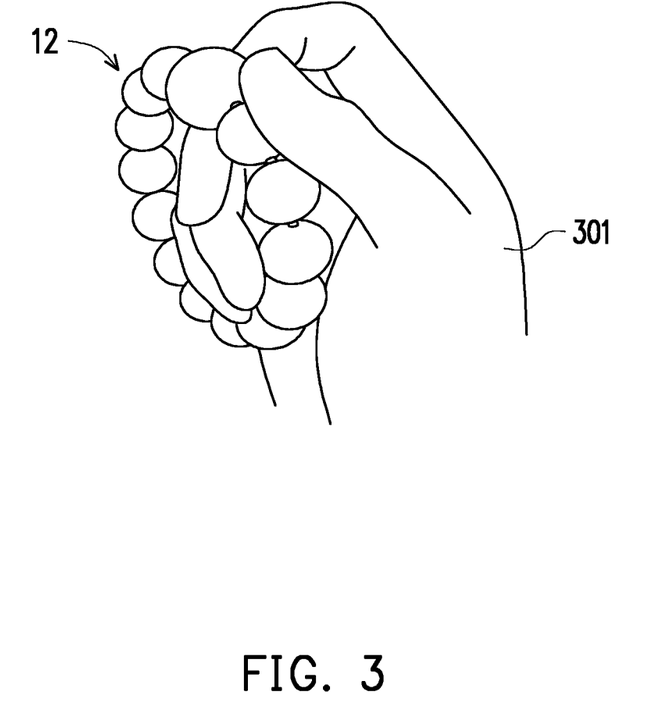
FIG. 3 is a schematic diagram of a sphere moving operation according to an embodiment of the invention.

FIG. 3 is a schematic diagram of a sphere moving operation according to an embodiment of the invention. Referring to FIG. 1, FIG. 2 and FIG. 3, when a user's hand 301 holds the portable electronic device 12 and toggles (i.e., rotates) the spheres of the portable electronic device 12, the sensor 211(1) may sense the angular change (or angular velocity change) of the sphere 121 and generate a corresponding angular velocity signal in response to the sphere moving operation. In other words, the angular velocity signal reflects the angular change (or the angular velocity change) of the sphere 121 caused by the sphere moving operation. At the same time, the sensor 211(2) may sense the position change, the gravity change, the acceleration change, and/or the magnetic field change of the sphere 121 and generate an acceleration signal in response to the sphere moving operation. In other words, the acceleration signal reflects the positional change (or gravity change) of the sphere 121 caused by the sphere moving operation.

The processor 215 may utilize the angular velocity signal to assist the acceleration signal to estimate the counting information corresponding to the sphere moving operation. For example, the counting information may reflect the number of times of at least one of the spheres 121 and 122(1) to 122(13) being moved by the user (also referred to as a sphere moving count). Taking FIG. 3 as an example, this counting information may reflect a counting times of the user's hand 301 sequentially moving the spheres 121 and 122 (1) to 122 (13) based on the center of the spheres 121 and 122 (1) to 122 (13). The processor 215 may transmit the counting information to the communication device 11 via the communication circuit 213. For example, the processor 205 of the communication device 11 may receive the counting information from the portable electronic device 12 via the communication circuit 203 and adjust display information of the display 201 based on the counting information. For example, the display 201 may display information indicating that the spheres of the portable electronic device 12 is moved several times based on the counting information.

Figure 4:
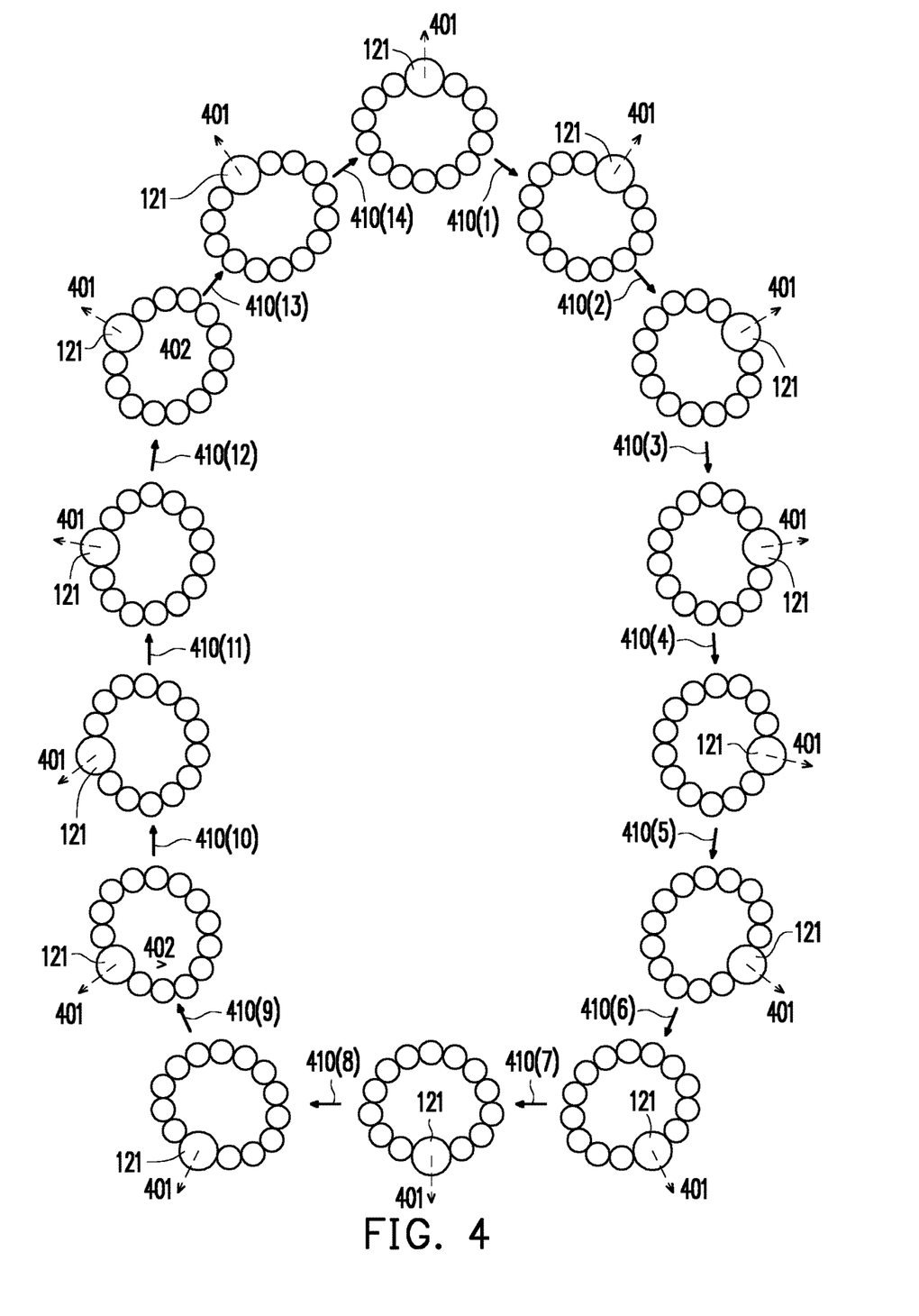
FIG. 4 is a schematic diagram of moving spheres of a portable electronic device according to an embodiment of the invention.

FIG. 4 is a schematic diagram of moving spheres of a portable electronic device according to an embodiment of the invention. Referring to FIG. 4, a sphere direction 401 of the sphere 121 may be changed when any one of the spheres 121 and 122(1)-122(13) are moved. In an embodiment, the sphere direction 401 can be used to indicate an angular change when one of the spheres 121 and 122(1)-122(13) is moved or rotated.

After the user performs a sphere moving operation 410(1) in a manner similar to FIG. 3, the sphere direction 401 changes in angle (i.e., the angle of the sphere direction 401 changes), and the sphere 121 changes in position (i.e., the position of the sphere 121 changes). The change in angle and the change in position can be obtained by analyzing at least one of the angular velocity signal and the acceleration signal. By analyzing the angular velocity signal and the acceleration signal, the counting information corresponding to the sphere moving operation 410(1) may be added by one, which indicates that the user has moved (or rotated) the spheres by one time. After the user continues to perform a sphere moving operation 410(2), the sphere direction 401 and the position of the sphere 121 change again. The angular change and the position change may also be obtained by analyzing at least one of the angular velocity signal and the acceleration signal. By analyzing the angular velocity signal and the acceleration signal, the counting information corresponding to the sphere moving operation 410(2) may be again added by one, which indicates that the user has moved (or rotated) the spheres by one time again. By analogy, after the sphere moving operations 410(1)-410(14) are continuously performed, the counting information can be added a total of 14 to indicate that the user has toggled (or rotated) the spheres 14 times.

In an embodiment, the processor 215 may determine whether the angular velocity signal conforms to a certain signal model (also referred to as a first signal model) and determine whether the acceleration signal conforms to another signal model (also referred to as a second signal model). Taking FIG. 4 as an example, the first signal model may reflect a preset angular change of the sphere direction 401 caused by one sphere moving operation (e.g., the sphere moving operation 410(1)). For example, the preset angle can be about 25 degrees ($^{360}/_{14}$) or larger or smaller. In addition, the second signal model may reflect a preset position change of the sphere 121 caused by one sphere moving operation (e.g., the sphere moving operation 410(1)). If the angular velocity signal conforms to the first signal model and/or the acceleration signal conforms to the second signal model, the processor 215 may update the counting information.

Figure 5:
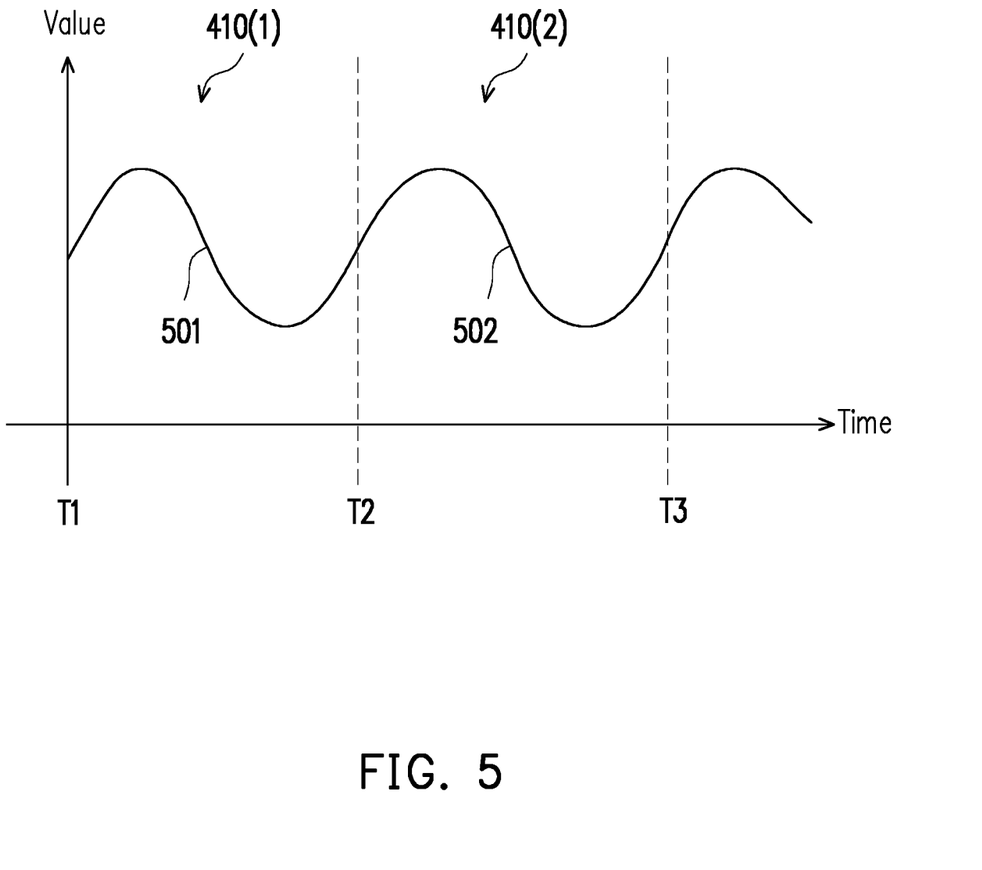
FIG. 5 is a schematic diagram of generating an acceleration signal in response to a sphere moving operation according to an embodiment of the invention.

FIG. 5 is a schematic diagram of generating an acceleration signal in response to a sphere moving operation according to an embodiment of the invention. The horizontal axis of FIG. 5 is time, and the vertical axis is signal values of the acceleration signal. Referring to FIG. 4 and FIG. 5, it is assumed that the acceleration signal 501 is generated between time points T1 and T2 in response to the sphere moving operation 410(1), and the acceleration signal 501 is presented as a waveform similar to a sine wave and conforms to the second signal model. Based on the acceleration signal 501, the processor 215 may update the counting information, such as adding the counting information by one. Then, it is assumed that the acceleration signal 502 is generated between time points T2 to T3 in response to the sphere moving operation 410(2), and the acceleration signal 502 is also presented as a waveform similar to the sine wave and also conforms to the second signal model. Therefore, according to the acceleration signal 502, the processor 215 may update the counting information again, for example, adding one to the counting information.

In an embodiment of FIG. 4, in response to a specific sphere moving operation (for example, the sphere direction 401 is changed by about 25 degrees by the sphere moving operation 410 (1)), the generated angular velocity signal may conform to the first signal model. Alternatively, in response to a specific sphere moving operation (for example, the position of the sphere 121 is moved to the next preset position or sufficient movement is generated by the sphere moving operation 410 (1)), the generated acceleration signal may conform to the second signal model. If it is detected that the angular velocity signal conforms to the first signal model and/or the acceleration signal conforms to the second signal model, the processor 215 may determine that one sphere moving operation is performed by the user and update the counting information accordingly.

It is noted that if the user dials (or rotates) the portable electronic device 12 in a vertical (or nearly vertical) direction relative to the ground plane in accordance with FIG. 3, the processor 215 has a high probability to update the counting information by detecting that the acceleration signal conforms to the second signal model. However, if the user dials (or rotates) the portable electronic device 12 in a parallel (or nearly parallel) direction relative to the ground plane, then there is a high probability that the processor 215 cannot detect the acceleration signal conforming to the second signal model. Alternatively, if the user causes the portable electronic device 12 to sway unexpectedly during the process of rotating the portable electronic device 12, then too many noise may be generated in the acceleration signal. As such, the acceleration signal that conforms to the second signal model may not be detected successfully. Therefore, in some cases (For example, if the user is lying on the bed and dialing the portable electronic device 12 or the user is walking while dialing the portable electronic device 12), the counting information may not accurately reflect how many times the spheres of the portable electronic device 12 being rotated by the user in the past period of time, thereby affecting the using experience.

In an embodiment, even if the acceleration signal conforming to the second signal model is not detected, the angular velocity signal conforming to the first signal model can also be used to detect the sphere moving operation, so as to overcome the aforementioned problems. Because once the user performs a sphere moving operation similar to those of FIG. 3 and FIG. 4, regardless of whether the tilt state of the portable electronic device 12 is vertical or parallel to the ground plane and/or whether the portable electronic device 12 is shaken, the angular velocity signal can accurately reflect the rotation state of the sphere 121 and there is a high probability that the angular velocity signal meets the first signal model. Therefore, using the angular velocity signal to assist the acceleration signal to estimate the counting information corresponding to the sphere moving operation may effectively improve the accuracy of the counting.

In an embodiment, the processor 215 can determine whether the angular velocity signal conforms to the first signal model. If it is determined that the angular velocity signal conforms to the first signal model, the processor 215 may adjust a trigger threshold value. The trigger threshold value is configured to identify the effective acceleration change in a preset direction. For example, the preset direction may be the current direction of gravity (i.e., a gravity direction). For example, processor 215 may lower the trigger threshold value. Accordingly, even if the change of the portable electronic device 12 in the gravity direction caused by the sphere moving operation is too small (e.g., the portable electronic device 12 is rotated parallel to the ground plane), a probability that a signal value of the acceleration signal being higher than the trigger threshold value may be increased by lowering the trigger threshold. If the signal value of the acceleration signal is higher than the trigger threshold value, the processor 215 may determine that the user has performed one sphere moving operation and update the counting information correspondingly.

It is noted that, although the foregoing embodiments proposes several ways to estimate the counting information corresponding to the sphere moving operation by using the angular velocity signal with an assistance of the acceleration signal, however, the present invention does not limit how the angular velocity signal is actually used to assist the acceleration signal to estimate the counting information. In other embodiments, all similar ways that estimating the counting information corresponding to the sphere moving operation by using the angular velocity signal with an assistance of the acceleration signal are within the scope of the present invention.

In an embodiment, the portable electronic device having beads (e.g., the spheres) may have different types. The processor of the portable electronic device may determine whether the portable electronic device is a first type portable electronic device or a second type portable electronic device. If the portable electronic device is the first type portable electronic device, the processor of the portable electronic device may activate a counting mode (also referred to as a first counting mode) to estimate the counting information corresponding to the sphere moving operation. If the portable electronic device is the second type portable electronic device, the processor of the portable electronic device may activate another counting mode (also referred to as a second counting mode) to estimate the counting information corresponding to the sphere moving operation. The first counting mode is different from the second counting mode. In addition, the first counting mode may include a mechanism related to the counting of the moving of the portable electronic device 12 described in the foregoing embodiments, and details of the specific operations are not repeatedly described herein.

Figure 6:
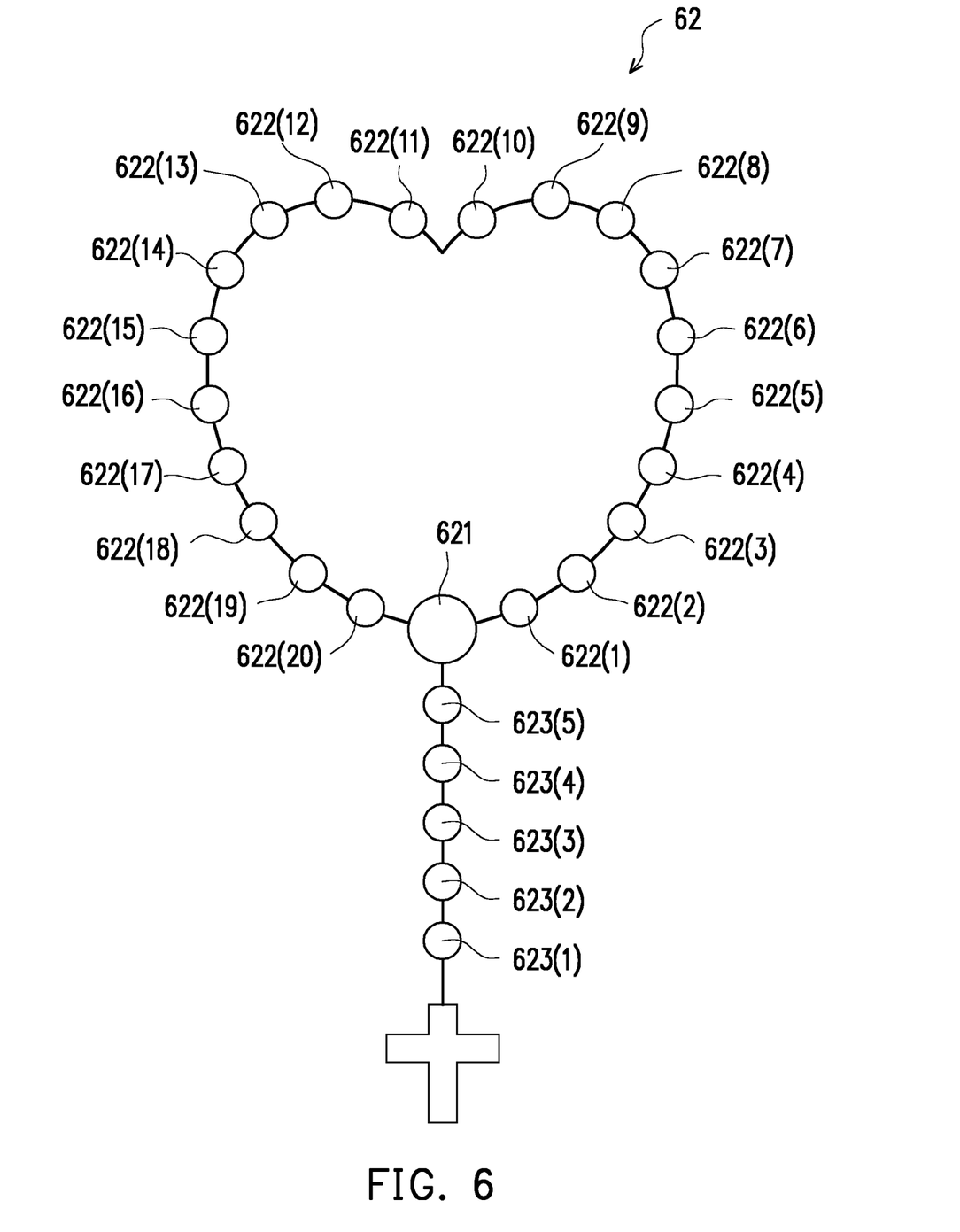
FIG. 6 is a schematic diagram of a portable electronic device according to an embodiment of the invention.

FIG. 6 is a schematic diagram of a portable electronic device according to an embodiment of the invention. Referring to FIG. 1 and FIG. 6, the portable electronic device 12 of FIG. 1 may be regarded as the first type portable electronic device, and the portable electronic device 62 of FIG. 6 can be regarded as the second type portable electronic device. The sensors and circuits of the portable electronic device 62 may be identical or similar to the sensors and circuits in the portable electronic device 12 of FIG. 1, respectively, and not be described repeatedly.

The portable electronic device 12 of FIG. 1 has the sphere 121 (i.e., the first sphere) and the spheres 122(1) to 122(13) that are ring-connected to the sphere 121. In contrast to the portable electronic device 12 of FIG. 1, the portable electronic device 62 has a sphere 621 (i.e., the first sphere), spheres 622(1) to 622(20) that are also ring-connected to the sphere 621, and spheres 623(1) to 623(5) (also referred to as second spheres) that is not ring-connected to the sphere 621, as shown in FIG. 6. In addition, one end of the spheres 623(1) to 623(5) can also be connected to other objects (such as the cross). It is noted that, similar to the portable electronic device 12 of FIG. 1, the present invention does not limit the numbers of the spheres 622(1) to 622(20) and 623(1) to 623(5) in the portable electronic device 62 and/or the appearance and so on.

In an embodiment of FIG. 6, the user may first hold the object at the end of the spheres 623(1) to 623(5) (for example, the cross of FIG. 6) and then move the spheres 623(1) to 623(5) one by one. Then, when the user dials to the sphere 621, the user starts performing the sphere moving operations on the spheres 621 and 622(1) to 622(20) which are ring-connected to each other and the sphere moving count is started to be counted. Relative to the first counting mode, the second counting mode further includes related operations which skip the movings of the spheres 623(1) to 623(5), so as to filter the counting for the movings of the sphere 623(1) to 623(5).

In the second counting mode, the first sensor (e.g., the gyroscope) and the second sensor (e.g., the gravity sensor) of the portable electronic device 62 may generate an angular velocity signal and an acceleration signal, respectively, in response to the sphere moving operation. In the second counting mode, when the user is dialing the spheres 623(1)-623(5), the processor of the portable electronic device 62 may skip N pulses in the acceleration signal. The N pulses are generated in response to the movings of the spheres 623(1) to 623(5). That is, the value of N corresponds to the number of the spheres 623(1) to 623(5). Taking FIG. 6 as an example, the total number of the spheres 623(1) to 623(5) is 5, then N may be 10. However, if the user dials the portable electronic device 12 of FIG. 1, the generated acceleration signal may not include these N pulses.

Figure 7:
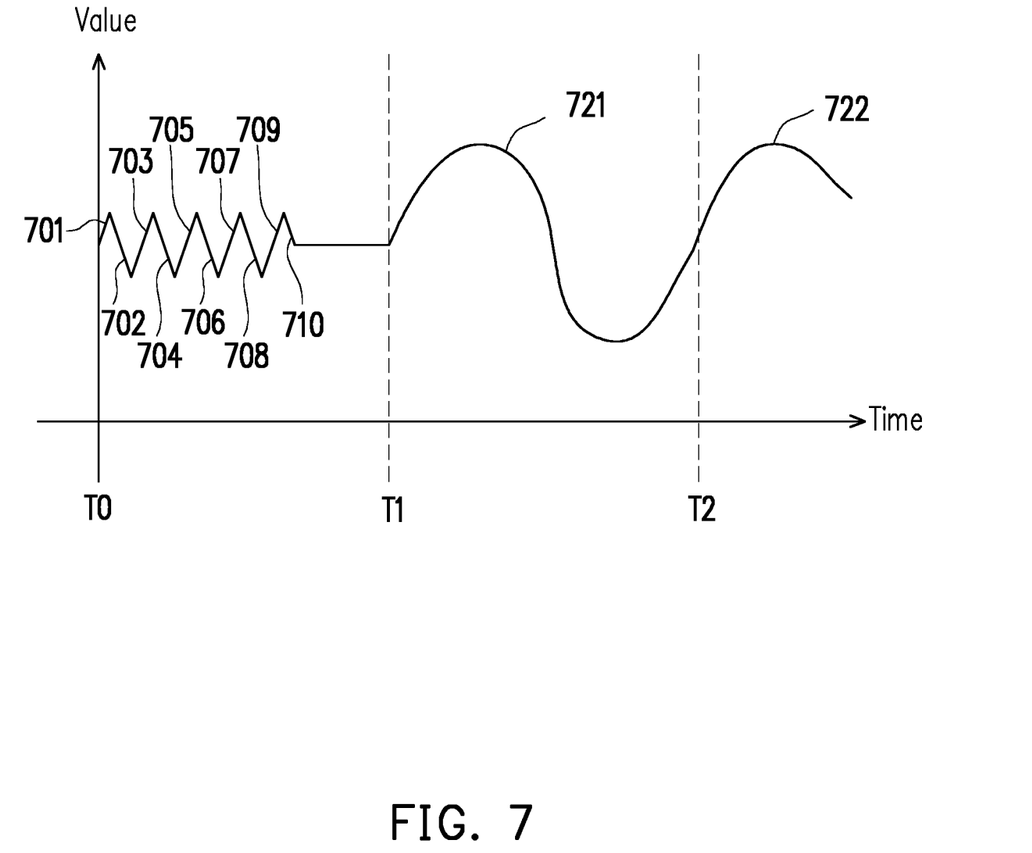
FIG. 7 is a schematic diagram of generating an acceleration signal in response to a sphere moving operation according to an embodiment of the invention.

FIG. 7 is a schematic diagram of generating an acceleration signal in response to a sphere moving operation according to an embodiment of the invention. Referring to FIG. 6 and FIG. 7, between the time points T0 and T1, it is assumed that the pulses 701 to 710 in the acceleration signal are caused by the movement of the spheres 623(1) to 623(5). In the second counting mode, the processor of the portable electronic device 62 may continuously count the number of pulses 701 to 710 in the acceleration signal and skip the pulses 701 to 710. In this way, the sequential moving of the spheres 623(1)~623(5) is not counted when counting the moving of the spheres 621 and 622(1)~622(20).

After skipping the pulses 701~710, when the user begins to perform the sphere moving operations on the spheres 621 and 622(1)-622(20) (and no longer dials the spheres 623(1)-623(5)), the processor of the portable electronic device 62 can use the continuously generated angular velocity signal to assist the continuously generated acceleration signal to estimate the counting information corresponding to the sphere moving operations. For example, the acceleration signal 721 similar to a sine wave is generated in response to one sphere moving operation of sphere 622(1) between the time points T1 and T2, and the acceleration signal 722 similar to the sine wave is generated in response to one sphere moving operation of sphere 622(2) after the time point T2. In an embodiment, the amplitude of each of the pulses 701-710 may be not higher than the amplitude of each of the acceleration signals 721 and 722. The processor of the portable electronic device 62 may update the counting information according to the acceleration signals 721 and 722 with an assistance of the corresponding angular velocity signal. For details of these operations, reference may be made to the foregoing embodiments, and details are not repeatedly described herein.

In an embodiment, the portable electronic device 62 may also communicate wirelessly with the communication device 11 of FIG. 1. The counting information obtained by the portable electronic device 62 may be transmitted to the communication device 11 for further use.

In an embodiment, the processor of the portable electronic device may determine the type of the portable electronic device via the communication device 11 of FIG. 1. For example, before starting the counting mechanism (for example, in an initial setting stage), the user can set the type of the portable electronic device via a setting interface of the communication device 11. For example, if the user sets that the connected portable electronic device is the portable electronic device 12 (i.e., the first type portable electronic device), the processor 205 of the communication device 11 may indicate the portable electronic device 12 to estimate the counting information corresponding to the sphere moving operation by using the first counting mode after the counting mechanism is started. Alternatively, if the user sets that the connected portable electronic device is the portable electronic device 62 (i.e., the second type portable electronic device), the processor 205 of the communication device 11 may indicate the portable electronic device 62 to estimate the counting information corresponding to the sphere moving operation by using the second counting mode after the counting mechanism is started.

In an embodiment, when the communication appliance 11 is connected to the portable electronic device 12, the processor 205 of the communication device 11 can automatically read device information of the portable electronic device 12. The processor 205 of the communication device 11 may automatically recognize the portable electronic device 12 as the first type portable electronic device according to the device information and indicate the portable electronic device 12 to estimate the counting information corresponding to the sphere moving operation by using the first counting mode after the counting mechanism is started. In addition, when the communication device 11 is connected to the portable electronic device 62, the processor 205 of the communication device 11 may automatically read the device information of the portable electronic device 62. The processor 205 of the communication device 11 may automatically recognize the portable electronic device 62 as the second type portable electronic device according to the device information and indicate the portable electronic device 62 to estimate the counting information corresponding to the sphere moving operation by using the second counting mode after the counting mechanism is started.

In an embodiment, the processor 215 of the portable electronic device 12 may automatically read the device information stored in the storage circuit 212 and determine that the portable electronic device 12 is the first type portable electronic device based on the device information and activate the first counting mode accordingly. Similarly, the processor of the portable electronic device 62 may automatically determine that the portable electronic device 62 is the second type portable electronic device based on the stored device information and activate the second counting mode accordingly.

It is noted that, in an embodiment, the operation of estimating the counting information corresponding to the sphere moving operation by using the angular velocity signal with an assistance of the acceleration signal may be performed by the processor of the communication device. Taking FIG. 1 as an example, in an embodiment, the processor 205 of the communication device 11 may receive the information of the angular velocity signal and the acceleration signal provided by the portable electronic device 12 and perform the operation of estimating the counting information corresponding to the sphere moving operation by using the angular velocity signal with an assistance of the acceleration signal.

Figure 8:
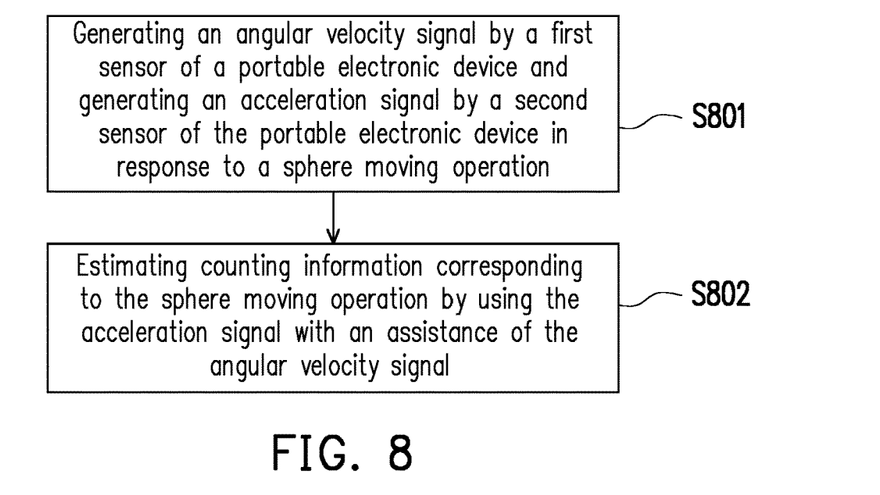
FIG. 8 is a flowchart of a counting information updating method according to an embodiment of the invention.

FIG. 8 is a flowchart of a counting information updating method according to an embodiment of the invention. Referring to FIG. 8, in step S801, in response to a sphere moving operation, an angular velocity signal is generated by a first sensor of a portable electronic device, and an acceleration signal is generated by a second sensor of the portable electronic device. In step S802, the angular velocity signal is used to assist the acceleration signal to estimate the counting information corresponding to the sphere moving operation.

Figure 9:
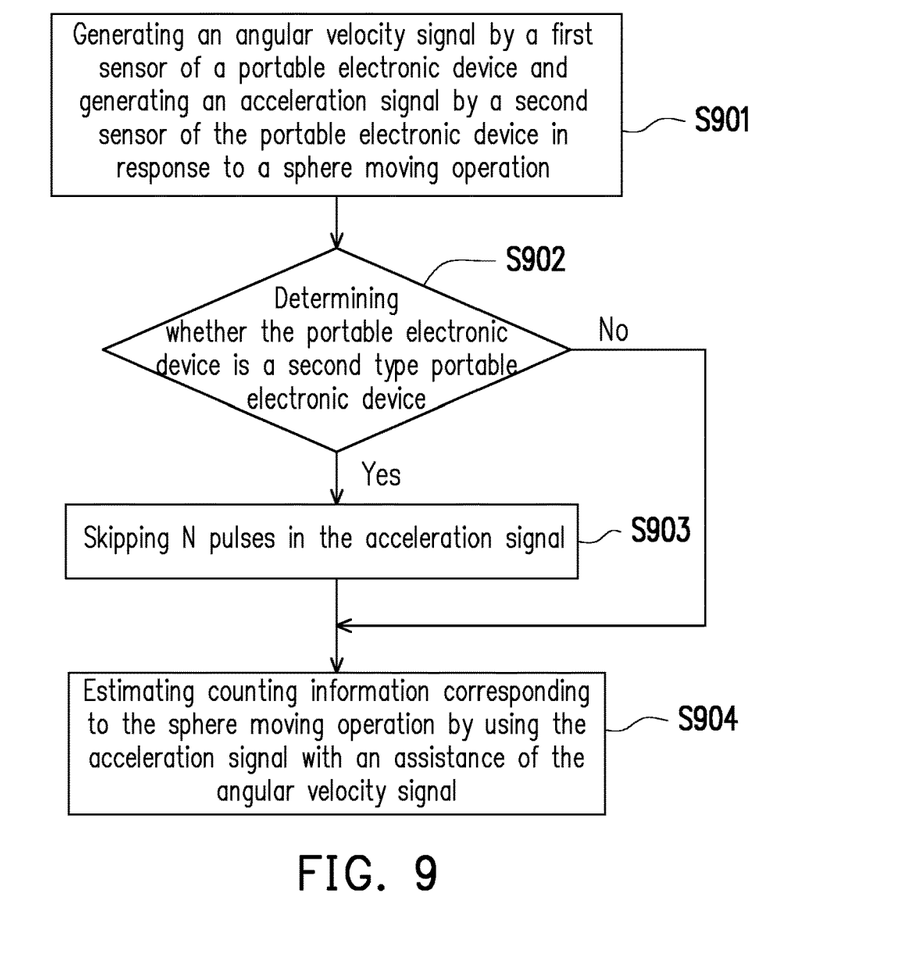
FIG. 9 is a flowchart of a counting information updating method according to an embodiment of the invention.

FIG. 9 is a flowchart of a counting information updating method according to an embodiment of the invention. Referring to FIG. 9, in step S901, in response to a sphere moving operation, an angular velocity signal is generated by a first sensor of a portable electronic device, and an acceleration signal is generated by a second sensor of the portable electronic device. In step S902, it is determined whether the portable electronic device is a second type portable electronic device. If the portable electronic device is the second type portable electronic device, after starting the counting mechanism, the second counting mode is activated and step S903 is executed. In step S903, N pulses in the acceleration signal are skipped. The value of N corresponds to the number of second spheres in the portable electronic device. In step S904, the angular velocity signal is used to assist the acceleration signal to estimate the counting information corresponding to the sphere moving operation. In addition, if the portable electronic device is not the second type portable electronic device (i.e., the portable electronic device is the first type portable electronic device), after starting the counting mechanism, the first counting mode is activated and step S904 is executed.

Figure 10:
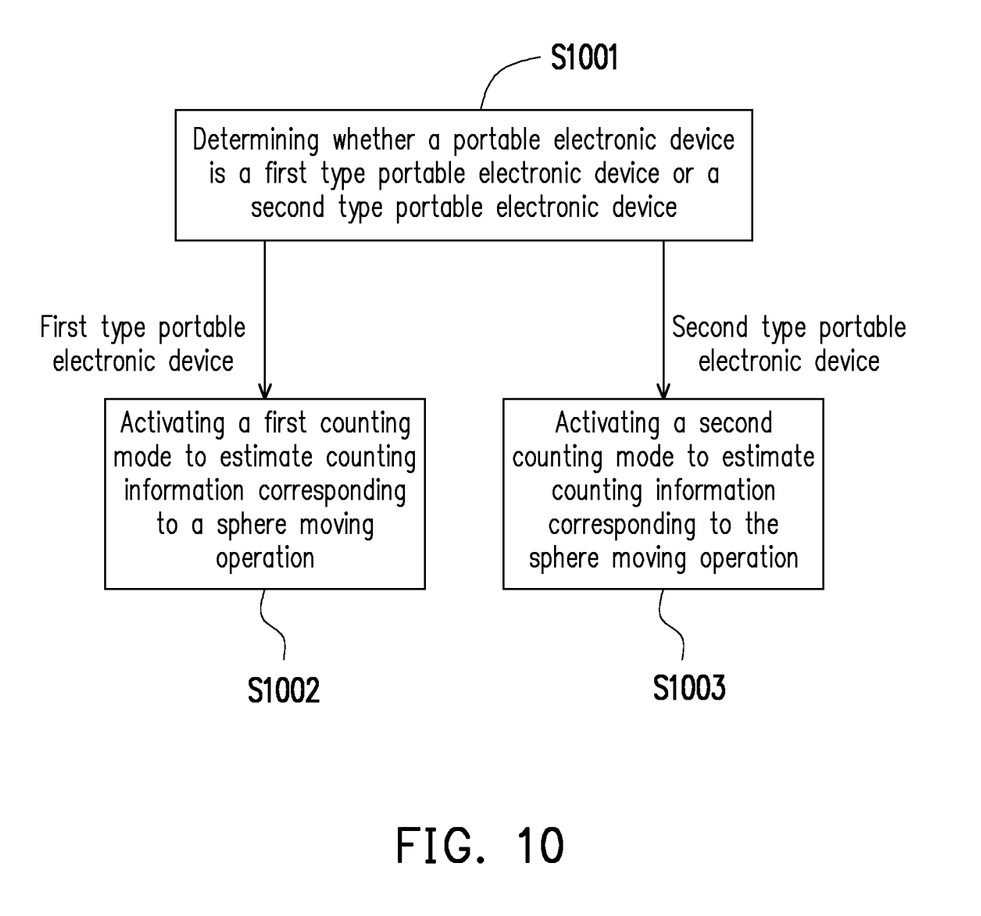
FIG. 10 is a flowchart of a counting information updating method according to an embodiment of the invention.

FIG. 10 is a flowchart of a counting information updating method according to an embodiment of the invention. Referring to FIG. 10, in step S1001, it is determined whether the portable electronic device is a first type portable electronic device or a second type portable electronic device. If the portable electronic device is the first type portable electronic device, in step S1002, the first counting mode is activated to estimate the counting information corresponding to the sphere moving operation by using an angular velocity signal with an assistance of an acceleration signal. Alternatively, if the portable electronic device is the second type portable electronic device, in step S1003, the second counting mode is activated to estimate the counting information corresponding to the sphere moving operation by using the angular velocity signal with the assistance of the acceleration signal.

However, the steps in FIGS. 8 to 10 have been described in detail above, and will not be described again here. It should be noted that each step in FIG. 8 to FIG. 10 can be implemented as a plurality of codes or circuits, and the present invention is not limited thereto. In addition, the methods of FIG. 8 to FIG. 10 may be used in combination with the above exemplary embodiments, or may be used alone, and the invention is not limited thereto.

In summary, when the sphere moving operation performed the portable electronic device occurs, the first sensor and the second sensor respectively generate the angular velocity signal and the acceleration signal. Then, the angular velocity signal can be used to assist the acceleration signal to estimate the counting information corresponding to the sphere moving operation. Thereby, the problem that the portable electronic device cannot accurately calculate the number of dialings under certain conditions may be effectively improved. In addition, for different types of portable electronic device, different counting modes may be dynamically and automatically activated to match the effective counting rules of different types of portable electronic device.

Although the present invention has been disclosed in the above embodiments, it is not intended to limit the present invention, and those skilled in the art can make some modifications and refinements without departing from the spirit and scope of the present invention. The scope of the invention is defined by the scope of the appended claims.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic system, comprising:
a communication device; and
a portable electronic device, wirelessly connected to the communication device,
wherein the portable electronic device comprises a processor, a communication circuit, a first sensor, a second sensor, and a plurality of spheres connected to each other, the processor is connected to the communication circuit, the first sensor and the second sensor,
the processor, the communication circuit, the first sensor and the second sensor are disposed in a first sphere of the plurality of spheres,
the first sensor generates an angular velocity signal and the second sensor generates an acceleration signal in response to a sphere moving operation,
the processor determines whether the angular velocity signal conforms to a first signal model,
the processor adjusts a trigger threshold value in response to the angular velocity signal conforming to the first signal model,
the processor updates counting information in response to a signal value of the acceleration signal being higher than the trigger threshold value, and
the processor transmits the counting information to the communication device.

2. The electronic system of claim 1, wherein the processor further determines whether the acceleration signal conforms to a second signal model, and
the processor updates the counting information if the acceleration signal conforms to the second signal model.

3. The electronic system of claim 1, wherein the acceleration signal reflects a position change of the first sphere caused by the sphere moving operation, and the angular velocity signal reflects an angular change of the first sphere caused by the sphere moving operation.

4. The electronic system of claim 1, wherein the adjusted trigger threshold value is configured to identify an effective acceleration change caused by the sphere moving operation in a preset direction.

5. The electronic system of claim 4, wherein the preset direction is a gravity direction.

6. The electronic system of claim 1, wherein an operation of adjusting the trigger threshold value comprises:
lowering the trigger threshold value from a first value to a second value.

7. A portable electronic device comprising:
a plurality of spheres, connected to each other;
a first sensor;
a second sensor; and
a processor, connected to the first sensor and the second sensor,
wherein the processor, the first sensor, and the second sensor are disposed in a first sphere of the plurality of spheres,
the first sensor generates an angular velocity signal and the second sensor generates an acceleration signal in response to a sphere moving operation,
the processor determines whether the angular velocity signal conforms to a first signal model,
the processor adjusts a trigger threshold value in response to the angular velocity signal conforming to the first signal model,
the processor updates counting information in response to a signal value of the acceleration signal being higher than the trigger threshold value.

8. The portable electronic device of claim 7, wherein the processor further determines whether the acceleration signal conforms to a second signal model, and
the processor updates the counting information if the acceleration signal conforms to the second signal model.

9. The portable electronic device of claim 7, wherein the acceleration signal reflects a position change of the first sphere caused by the sphere moving operation, and the angular velocity signal reflects an angular change of the first sphere caused by the sphere moving operation.

10. The portable electronic device of claim 7, wherein the adjusted trigger threshold value is configured to identify an effective acceleration change caused by the sphere moving operation in a preset direction.

11. The portable electronic device of claim 10, wherein the preset direction is a gravity direction.

12. The portable electronic device of claim 7, wherein an operation of adjusting the trigger threshold value comprises:
lowering the trigger threshold value from a first value to a second value.

13. A counting information updating method for a portable electronic device having a plurality of spheres connected with each other, the counting information updating method comprising:
generating an angular velocity signal by a first sensor of the portable electronic device and generating an acceleration signal by a second sensor of the portable electronic device in response to a sphere moving operation;
determining whether the angular velocity signal conforms to a first signal model;
adjusting a trigger threshold value in response to the angular velocity signal conforming to the first signal model; and
updating counting information in response to a signal value of the acceleration signal being higher than the trigger threshold value.

14. The counting information updating method of claim 13, further comprising:
determining whether the acceleration signal conforms to a second signal model; and
updating the counting information if the acceleration signal conforms to the second signal model.

15. The counting information updating method of claim 13, wherein the acceleration signal reflects a position change of the first sphere caused by the sphere moving operation, and the angular velocity signal reflects an angular change of the first sphere caused by the sphere moving operation.

16. The counting information updating method of claim 13, wherein the adjusted trigger threshold value is configured to identify an effective acceleration change caused by the sphere moving operation in a preset direction.

17. The counting information updating method of claim 16, wherein the preset direction is a gravity direction.

18. The counting information updating method of claim 13, wherein a step of adjusting the trigger threshold value comprises:
   lowering the trigger threshold value from a first value to a second value.

* * * * *